(No Model.)
H. F. W. KOLTHOFF & A. PERKUHN.
Water Filter.
No. 239,258. Patented March 22, 1881.
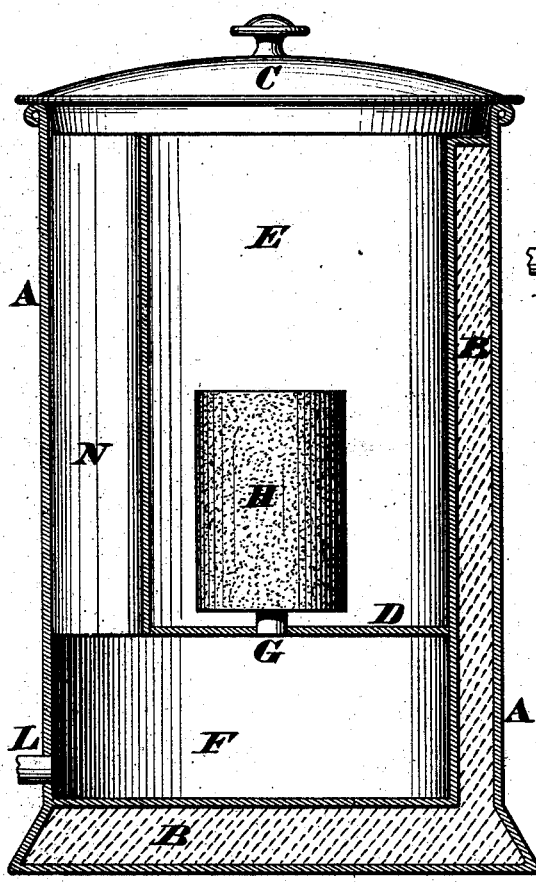
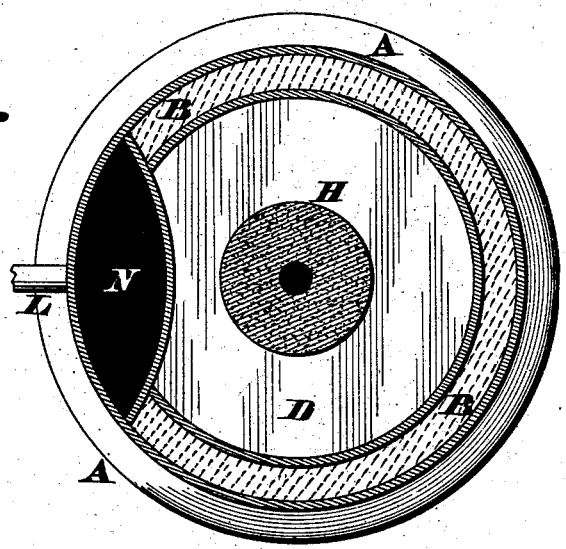
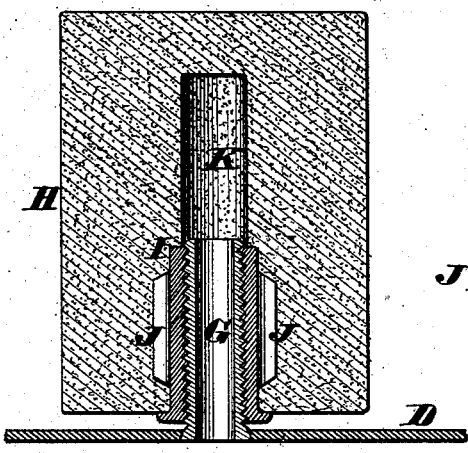
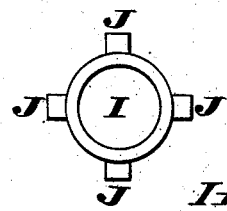

UNITED STATES PATENT OFFICE.

H. FRIEDRICH W. KOLTHOFF AND ALBERT PERKUHN, OF CINCINNATI, OHIO.

WATER-FILTER.

SPECIFICATION forming part of Letters Patent No. 239,258, dated March 22, 1881.

Application filed October 18, 1880. (No model.)

*To all whom it may concern:*

Be it known that we, H. FRIEDRICH W. KOLTHOFF and ALBERT PERKUHN, both of Cincinnati, Hamilton county, Ohio, have invented certain new and useful Improvements in Water-Filters, of which the following is a specification.

Our invention consists in providing a suitable vessel or receptacle with three distinct chambers, of which the upper one contains the foul water, while the lower one receives the pure water, said upper chamber being furnished with a porous core composed of an artificial stone, through which the fluid passes, and is filtered as it descends into the lower compartment, this filtered water being cooled with ice placed in the third chamber or pocket, that communicates with said lower compartment, as hereinafter more fully described.

Our invention further comprises a novel combination of ingredients wherewith is prepared said artificial stone, as hereinafter more fully described, and set forth in the claims.

In the annexed drawings, Figure 1 is an axial section of our improved water-filter. Fig. 2 is a horizontal section of the same. Fig. 3 is an enlarged axial section of the filtering-core and its accessories, the nut thereof being shown in a detached plan to the right of said core.

The vessel or receptacle A, which may be of any suitable size, shape, and material, is provided with a non-conducting filling, B, and is surmounted with a customary lid or cover, C. Located within this vessel is an imperforate partition, D, which divides said vessel into two chambers, E F, of which compartments the upper one, E, is designed to contain the impure water. This partition has fastened to it a tube, G, which penetrates and fits water-tight in the filtering-core H, the latter being a porous artificial stone, prepared as hereinafter described. It is preferred to screw-thread the tube G externally, so as to enable it to be readily engaged with a nut, I, inserted in the lower end of the core H, said nut being armed with ribs or flanges J, to prevent it rotating within said core.

K is an axial bore that passes almost, but not entirely, through this core.

L represents a portion of the discharge-cock or faucet.

N is a pocket at one side of vessel A, for containing ice, said pocket being in communication with the pure-water chamber F.

When the upper chamber, E, is filled with foul water, it is evident the fluid can escape therefrom only as it flows through the core H and tube G into the lower compartment, F, and as a result of this percolation said core serves as a filtering medium to arrest any impurities with which the water may be charged. Consequently the water supplied to the lower chamber, F, is perfectly pure and wholesome, and by simply charging the pocket N with ice the temperature of the water may be reduced to any desired degree.

In constructing our filter we make the core H of equal parts of ground pumice-stone, burnt-bone flour, and pulverized charcoal, to which may be added a small quantity of sawdust, if desired. These ingredients are mixed with water, then molded or pressed into any desired shape, and finally burned in a kiln or oven, so as to render the core hard and durable, and capable of being again put in the fire for the purpose of burning out any impurities that may have accumulated in the pores of said core; or, in other words, this core is an artificial stone especially adapted to purify water on account of the charcoal contained therein.

The nut I may be placed in the mold, so as to cause the compound to be pressed compactly around the former, by which means said nut will be so firmly anchored in the core as never to become detached therefrom.

In some cases it may be found desirable to reverse the operation of the filter, and cause the impure water to ascend through the core H and be cleansed as it flows into the upper chamber, E.

We are aware it is not new to divide a tank by means of an imperforate partition, and place in the upper chamber a cage or perforated receptacle containing sponge or other filtering media, in order that the water may be purified as it flows through such media, as this construction is seen in several patents. Such being the state of the art, our claim to this feature of the invention is not to be construed broadly, but is expressly limited to a chambered filter in which water is purified by flowing through a porous core composed of artificial stone, and is cooled by means of ice contained in a side pocket communicating with the lower chamber of the device.

We claim as our invention—

1. The combination of vessel A, imperforate partition D, chambers E F, porous filtering-core H, and ice-pocket N, which pocket communicates with the lower chamber, F, as herein described.

2. The interiorly-threaded and ribbed nut I J, embedded in the filtering-core H, and anchored therein by baking said core around said nut, for the purpose specified.

3. A porous filtering-core composed of ground pumice-stone, burnt-bone flour, and pulverized charcoal, compounded and prepared substantially as herein described, thereby producing an artificial stone, for the purpose stated.

In testimony of which invention we hereunto set our hands.

H. FRIEDRICH W. KOLTHOFF.
  ALBERT PERKUHN.

Witnesses:
  JAMES H. LAYMAN,
  J. F. TWOHIG.